(No Model.) 2 Sheets—Sheet 1.

W. M. COFFEE.
PIPE COUPLING.

No. 598,857. Patented Feb. 8, 1898.

WITNESSES
George O'Byrne
Gabriel P. Finch

INVENTOR
William M. Coffee
by A. H. Ste Marie
atty (No Model.) 2 Sheets—Sheet 2.

W. M. COFFEE.
PIPE COUPLING.

No. 598,857. Patented Feb. 8, 1898.

WITNESSES
Fabius T. Finch
George O'Byrne

INVENTOR
W. M. Coffee
by A. H. Ste Marie
atty

UNITED STATES PATENT OFFICE.

WILLIAM M. COFFEE, OF SAN FRANCISCO, CALIFORNIA, ASSIGNOR OF ONE-HALF TO GILMAN LAMBERT AND AUGUST F. HOPKE, OF SAME PLACE.

PIPE-COUPLING.

SPECIFICATION forming part of Letters Patent No. 598,857, dated February 8, 1898.

Application filed August 6, 1896. Serial No. 601,905. (No model.)

*To all whom it may concern:*

Be it known that I, WILLIAM M. COFFEE, a citizen of the United States, and a resident of the city and county of San Francisco, in the State of California, have invented a certain new and useful Improvement in Pipe-Couplings, of which the following is a specification.

My invention has reference to means or devices for uniting adjacent parts or objects, particularly the ends of two pipes which it is desired to connect.

The object of said invention is to provide a substantial and simple joint whereby pipes, among other things, may be united without cutting screw-threads on the ends or parts thereof that are to be brought together.

In systems of piping it is often necessary to cut a pipe in order to accomplish some particular work. To connect again with the other pipes in the same series, it is the custom to form screw-threads on the cut pipe, so as to secure a proper joint. This operation consumes time and is more or less inconvenient and expensive, especially where repairs are being made, as floors may have to be taken up, ditches dug, or walls cut through to clear and disconnect the cut pipe before it can be threaded, screwed back in place, and jointed anew. It has therefore been my aim to devise a coupling that will obviate all this trouble and expense by effecting a perfect joint, whether or not there be threads on the pipes or sections of pipes to which it is applied, having merely to be slipped over the ends of pipes that are to be jointed and firmly uniting the same by mere compression of its component parts. Such is the invention made by me and now disclosed herein.

Figure 1:
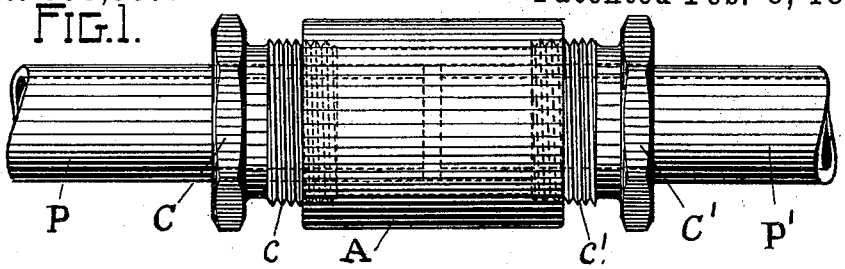
Figure 2:
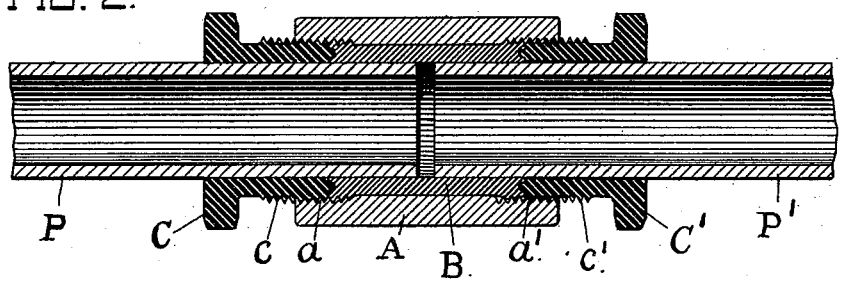
Figure 3:
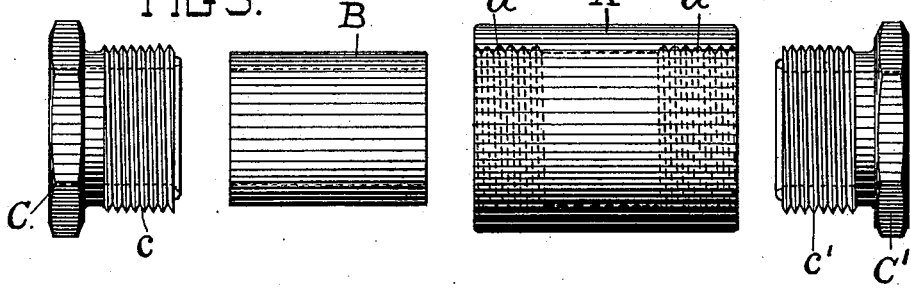
Figure 4:
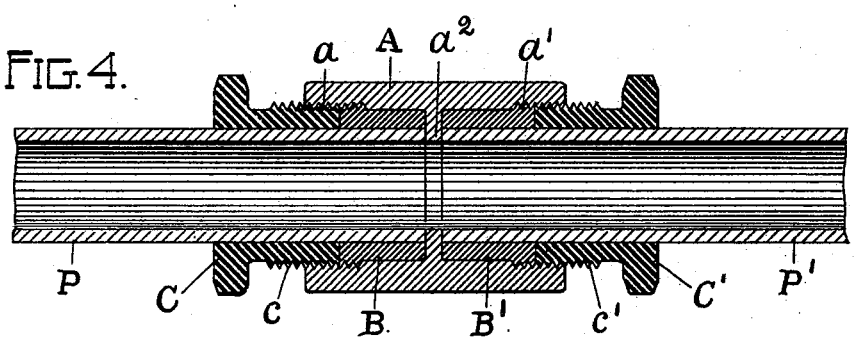
Figure 5:
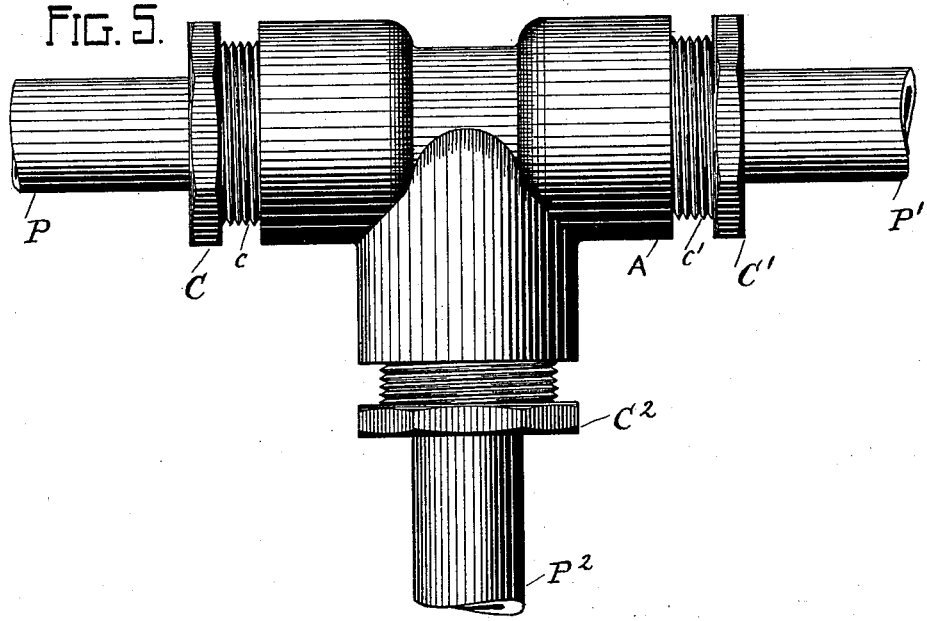
Figure 6:
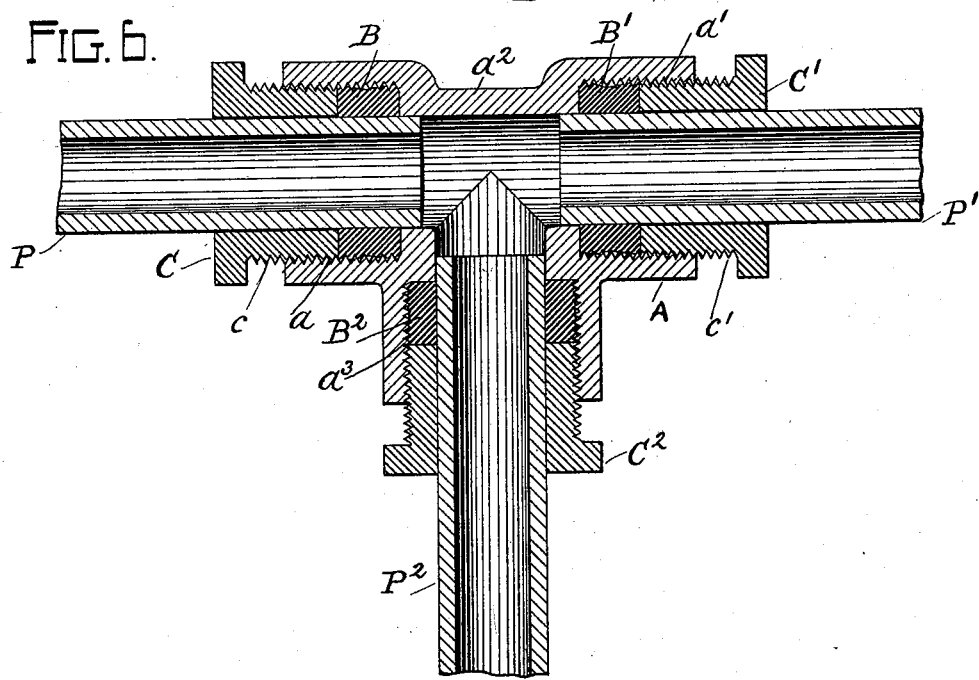

Referring to the drawings hereto annexed for a description of my said invention, Figure 1 is a side view showing my improved coupling applied to the adjoining ends of two pipes such as are used for conveying water, gas, oil, &c. Fig. 2 is a longitudinal section of the same. Fig. 3 is a detailed view of the sundry parts composing said coupling. Fig. 4 is a longitudinal section illustrating a modified form of my invention. Fig. 5 is a side elevation of another modification slightly different from that shown in the preceding figure, and Fig. 6 is a central sectional elevation of the construction represented by said Fig. 5.

Like letters of reference are used to indicate like parts throughout the several views.

The letter A represents a sleeve made, preferably, of metal and of a diameter a little larger than the ends of pipes, such as P P', which it is desired to join together. This sleeve is screw-threaded internally in each end, as at $a$ $a'$. In cutting the internal threads in the ends of the sleeve the ends are made of slightly greater internal diameter than the central unthreaded portions and for the purpose of allowing the ends of the inner sleeves to be expanded, as shown in Figs. 2 and 4, by the nuts C C'.

B is an inner sleeve made to slip loosely into the sleeve A and to be brought in about the middle thereof directly over the space or interstice intervening between the pipes to be connected. This inner sleeve is intended as a packing or gasket for the joint to be formed and may be made of any material adapted for such purpose, as lead, copper, asbestos, &c.

C C' are nuts or bushings made to screw into the ends of the outer sleeve A, the same being provided with external screw-threads $c$ $c'$, engaging the internal screw-threads $a$ $a'$ in said outer sleeve. These nuts or bushings are run from opposite sides against the ends of the packing sleeve or gasket B, as illustrated.

The above-enumerated parts constitute the entire coupling.

To make a joint, I slip first the packing-sleeve B into the outer or false sleeve A, then insert the nuts C C' and slide the whole over the cut pipe. There I adjust the gasket over the joint or ends of the pipe, and, lastly, screw in the nuts as far as they will reach inside the false sleeve to crush the leaden or other packing material therein and cause it to fill all empty spaces or interstices about the same. The work is then complete and a joint is obtained which is quite strong, tight, and durable, as actual tests have demonstrated. A joint of this sort, it will be readily seen, is also made in a much shorter time than when the cut pipe is threaded, since the pipe need be but partly uncovered and no uncoupling of sections is required. All there is to be done, as above stated, is to place the coupling on one end of the cut pipe, then swing the end of the other pipe opposite, slip the coupling over the joint or space between the two pipe ends, and screw in the forcing-nuts against the packing material and a perfect joint is insured.

The sleeve A can be made with an internal dividing rib or bead in the center, as at $a^2$ in Fig. 4, for the pipes entering either of its ends to abut against. In that case two shorter sleeves B B', of packing material, are used instead of one long one. I prefer, though, the plain undivided outer sleeve with the single gasket, as shown in the other views.

Figs. 5 and 6 represent a pipe-coupling of similar construction to that illustrated in Fig. 4, except there is provided in the side of the outer sleeve an internally-threaded opening $a^3$, corresponding in general detail to either end of the coupling, the internal thread of said opening being engaged by an externally-threaded nut or bushing $C^2$, fitted to screw into it. This opening $a^3$ is adapted to receive a branch pipe $P^2$, and in it is placed a packing-sleeve $B^2$ in advance of the nut to make the joint, as in the other cases. More than one opening like $a^3$ may be provided in the coupling, if desired or found expedient, the joint for each being made in a similar manner.

By preference the inner ends of the bushings or nuts C C' are beaded or V-shaped—that is, more or less rounded or pointed, as illustrated in Figs. 2 and 3, instead of being cut flat or square, as in Fig. 4—in order to better crush the packing material when driven against it.

Having now described my invention, what I claim, and desire to secure by Letters Patent of the United States, is—

1. In a pipe-coupling, the sleeve A, threaded internally at both of its ends, and having its central unthreaded portion of less diameter than the two threaded ends, combined with two nuts C C', the packing B, and the two pipes which have their ends inserted into the coupling, the ends of the nuts being sharp-edged so as to expand the ends of the packing into the screw-threaded portion, substantially as described.

2. In a pipe-coupling, the sleeve A, provided with the internal central dividing-rib $a^2$, and internally screw-threaded at both of its ends, the unthreaded portion of the sleeve being of smaller diameter than the threaded portions, combined with the nuts C C', the tubular packings, and the pipes, substantially as specified.

3. The combination, in a pipe-coupling, of a suitable packing, such as a sleeve of lead, or copper, or asbestos, &c., a screw-threaded sleeve adapted to be slipped over the same, and a beaded or pointed nut engaging said screw-threaded sleeve and adapted to be driven against and into the packing therein, substantially as described.

In testimony whereof I affix my signature in presence of two witnesses.

W. M. COFFEE. [L. S.]

Witnesses:
A. H. STE. MARIE,
WM. B. LATHAM.